(12) United States Patent
Fochtman et al.

(10) Patent No.: US 6,431,474 B2
(45) Date of Patent: *Aug. 13, 2002

(54) COMPRESSED NATURAL GAS FUEL INJECTOR HAVING MAGNETIC POLE FACE FLUX DIRECTOR

(75) Inventors: James Paul Fochtman, Williamsburg; Danny Orlen Wright, Cobb's Creek, both of VA (US)

(73) Assignee: Siemens Automotive Corporation, Auburn Hills, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/320,179

(22) Filed: May 26, 1999

(51) Int. Cl.$^7$ .................................................. B05B 1/30
(52) U.S. Cl. ................................ 239/585.4; 251/129.21
(58) Field of Search ........................ 239/585.1–585.5; 251/129.15, 129.18, 129.21

(56) References Cited

U.S. PATENT DOCUMENTS

| | | | |
|---|---|---|---|
| 2,291,968 A | 8/1942 | Keefe ........................... 175/336 |
| 3,662,987 A | 5/1972 | Schlagmuller et al. ...... 251/139 |
| 3,731,881 A | 5/1973 | Dixon et al. ................. 239/585 |
| 3,937,855 A | 2/1976 | Gruenwald | |
| 4,331,317 A | 5/1982 | Kamai et al. | |
| 4,586,017 A | 4/1986 | Laskaris et al. | |
| 4,634,055 A | 1/1987 | Hans et al. | |
| 4,662,567 A | 5/1987 | Knapp ......................... 239/585 |
| 4,688,723 A | 8/1987 | Kern et al. .................. 239/391 |
| 4,693,227 A | 9/1987 | Satou ........................... 123/575 |
| 4,783,009 A | 11/1988 | Coates ....................... 239/580 |
| 4,909,447 A | 3/1990 | Gallup et al. ............... 239/585 |
| 4,922,862 A | 5/1990 | Casacci ...................... 123/1 A |
| 4,946,107 A | 8/1990 | Hunt ........................... 239/585 |
| 4,978,074 A | 12/1990 | Weinand ...................... 239/585 |
| 4,984,744 A | 1/1991 | Babitzka et al. | |
| 4,988,967 A | 1/1991 | Miller et al. ................. 335/279 |
| 5,025,554 A | 6/1991 | Dohi ............................. 29/860 |
| 5,033,716 A | 7/1991 | Mesenich ............. 251/129.21 |
| 5,035,360 A | 7/1991 | Green et al. ................. 239/585 |
| 5,046,472 A | 9/1991 | Linder ......................... 123/533 |

(List continued on next page.)

FOREIGN PATENT DOCUMENTS

| | | |
|---|---|---|
| DE | 19638201 A | 9/1996 |
| GB | 2 044 986 | 10/1980 |

*Primary Examiner*—Andres Kashnikow
*Assistant Examiner*—Dinh Q. Nguyen (57) ABSTRACT

An electromagnetically operable fuel injector for a fuel injection system of an internal combustion engine is disclosed having a ferromagnetic core, a magnetic coil at least partially surrounding the ferromagnetic core and an armature magnetically coupled to the magnetic coil and being movably responsive to the magnetic coil. The armature actuates a valve-closing element, which interacts with a fixed valve seat and is movable away from the fixed valve seat of a fuel valve when the magnetic coil is excited. The armature has a generally elongated shape and a generally central opening for reception of fuel from a fuel inlet connector positioned adjacent thereto. The fuel inlet connector extends in a generally longitudinal direction above the armature and defines a central path for fuel to enter the inlet connector and to be directed toward the armature for further passage toward the fixed valve seat. The fuel inlet connector has a lowermost end portion spaced above the armature to define a working gap through which the armature is movable to open and close the valve. The lowermost end portion of the fuel inlet connector has a transverse cross-sectional dimension corresponding to the transverse dimension of an upper end face of the armature to define a substantially direct magnetic flux path between the armature and the fuel inlet connector.

23 Claims, 4 Drawing Sheets

U.S. PATENT DOCUMENTS

| | | | |
|---|---|---|---|
| 5,092,305 A | 3/1992 | King | 123/575 |
| 5,127,585 A | 7/1992 | Mesenich | 239/585.5 |
| 5,129,381 A | 7/1992 | Nakajima | 123/531 |
| 5,131,599 A | 7/1992 | Maier | |
| 5,174,505 A | 12/1992 | Shen | 239/417.3 |
| 5,209,408 A | 5/1993 | Reiter | |
| 5,232,167 A | 8/1993 | McCormick et al. | |
| 5,301,874 A | 4/1994 | Vogt et al. | |
| 5,341,994 A | 8/1994 | Wakeman | 239/585.5 |
| 5,344,081 A | 9/1994 | Wakeman | |
| 5,373,992 A | 12/1994 | Reiter | |
| 5,381,966 A | 1/1995 | Gernert et al. | 239/585.3 |
| 5,383,606 A | 1/1995 | Stegmaier et al. | |
| 5,392,995 A * | 2/1995 | Wahba | 239/585.4 |
| 5,494,223 A | 2/1996 | Hall et al. | 239/585.5 |
| 5,494,224 A * | 2/1996 | Hall et al. | 239/585.5 |
| 5,529,387 A | 6/1996 | Mialkowski | |
| 5,544,816 A | 8/1996 | Nally et al. | |
| 5,566,920 A | 10/1996 | Romann et al. | 252/129.21 |
| 5,609,304 A | 3/1997 | Sasao | 239/585.4 |
| 5,613,640 A | 3/1997 | Furuya et al. | 239/585.5 |
| 5,628,294 A | 5/1997 | Krieckaert et al. | 123/525 |
| 5,632,467 A | 5/1997 | Just et al. | 251/129.21 |
| 5,678,767 A | 10/1997 | Rahbar | 239/533.2 |
| 5,687,698 A * | 11/1997 | Mastro et al. | 251/129.15 X |
| 5,704,553 A | 1/1998 | WieczoreK et al. | 239/585.1 |
| 5,730,367 A | 3/1998 | Pace et al. | 239/408 |
| 5,735,253 A | 4/1998 | Perotto et al. | 173/575 |
| 5,755,211 A * | 5/1998 | Koch | 123/525 |
| 5,758,865 A | 6/1998 | Casey | |
| 5,785,251 A | 7/1998 | Wood et al. | 239/417.3 |
| 5,794,860 A | 8/1998 | Neumann | 239/585.5 |
| 5,860,601 A | 1/1999 | Egizi | 239/533.12 |
| 5,875,972 A | 3/1999 | Ren et al. | |
| 5,915,626 A | 6/1999 | Awarzmani et al. | |
| 5,918,818 A | 7/1999 | Takeda | |
| 5,921,475 A | 7/1999 | De Vries et al. | 239/585.4 |
| 5,927,613 A | 7/1999 | KoyanagI et al. | 239/585.1 |
| 5,996,911 A | 12/1999 | Gesk et al. | |
| 5,996,912 A | 12/1999 | Ren et al. | 239/585.5 |
| 6,000,628 A | 12/1999 | Lorraine | 239/87 |
| 6,003,791 A | 12/1999 | Reiter | 239/575 |
| 6,027,050 A | 2/2000 | Rembold et al. | 239/585.5 |
| 6,032,879 A * | 3/2000 | Hamada et al. | 239/585.1 |
| 6,076,802 A | 6/2000 | Maier | |
| 6,079,642 A | 6/2000 | Maier | |
| 6,102,303 A | 8/2000 | Bright et al. | |
| 6,089,467 A1 | 7/2001 | Fochtman et al. | |

* cited by examiner

COMPRESSED NATURAL GAS FUEL INJECTOR HAVING MAGNETIC POLE FACE FLUX DIRECTOR

BACKGROUND OF THE INVENTION

1. Field of the Invention

The present application relates to a fuel injector particularly adapted for use with compressed natural gas. The injector includes a magnetic pole flux director, which reduces flux leakage and improves the effectiveness of the magnetic circuit.

2. Description of the Related Art

Compressed natural gas (hereinafter sometimes referred to as "CNG") is becoming a common automotive fuel for commercial fleet vehicles and residential customers. In vehicles, the CNG is delivered to the engine in precise amounts through gas injectors, hereinafter referred to as "CNG injectors". The CNG injector is required to deliver a precise amount of fuel per injection pulse and maintain this accuracy over the life of the injector. In order to maintain this level of performance for a CNG injector, certain strategies are required to optimize the combustion of the fuel.

The CNG (Compressed Natural Gas) injector is required to open and close very quickly to promote efficient fuel consumption. In order to accomplish this objective effectively the magnetic circuit utilized to open the valve needle must produce a magnetic field—or flux—relatively quickly across the working gap between the fuel inlet connector and the armature. The present CNG injector has a magnetic circuit consisting of an inlet connector, armature, valve body shell, housing and a coil. When energized, the coil produces a magnetic field, which is conducted through the magnetic circuit. The flux is conducted through the components and creates an attractive force at the working gap, which force causes upward movement of the armature, with consequent upward movement of the valve needle to open the injector valve.

It is known that the magnetic field will be conducted through any surrounding path of least reluctance because the property of reluctance in a magnetic circuit is similar to resistance in an electrical circuit. For example, ferrous steels have a reluctance considerably less than the reluctance of air. If the magnetic circuit has poor material, poor design, or a working gap that is too large, the magnetic field will "leak" out of the intended path and complete the circuit using the path of least reluctance. Moreover, the magnetic force is inversely proportional to the square of the distance through which it must act. Accordingly, avoidance of leakage of magnetic flux is significant and desirable.

This magnetic leakage reduces the effectiveness of the field that is generated and requires that more fields be created to reach the designed level of performance. In most injector designs, it is necessary to have a smaller outer diameter for the armature than the outer diameter of the pole piece. This is driven by constraints to reduce the outer diameter of the injector and improve performance. To achieve the smaller outer diameter, the magnetic cross section must be reduced. One of the easiest components to reduce is the diametrical cross section of the coil. It can be made longer and thinner and wound to a number of turns and resistance which is acceptable. This strategy tends to increase the leakage through the coil by bringing the housing closer to the inlet connector. As the reluctance of any portion of the circuit, usually the working gap portion due to the increased reluctance of air, becomes greater than a direct path from the inlet connector to the housing, leakage occurs.

We have invented a fuel injector, which directs the magnetic flux to the desired locations with increased intensity and reduced leakage.

BRIEF SUMMARY OF THE INVENTION

The invention relates to an electromagnetically operable fuel injector for a fuel injection system of an internal combustion engine, the injector having a generally longitudinal axis, which comprises, a ferromagnetic core, a magnetic coil at least partially surrounding the ferromagnetic core, an armature magnetically coupled to the magnetic coil and being movably responsive to the magnetic coil, the armature actuating a valve closing element which interacts with a fixed valve seat of a fuel valve and being movable away from the fixed valve seat when the magnetic coil is excited. The armature has a generally elongated shape and a generally central opening for reception of fuel from a fuel inlet connector positioned adjacent thereto. A fuel inlet connector extends generally longitudinally of the injector and is positioned adjacent the armature and defines a central path for fuel to enter the inlet connector and to be directed toward the armature for further passage toward the fixed valve seat. The fuel inlet connector has a lowermost end portion spaced above the armature and facing the fuel inlet connector to define a working gap through which the armature is movable to open and close the valve. The lowermost end portion of the fuel inlet connector has a transverse cross-sectional dimension corresponding to the transverse dimension of an upper end face of the armature to define a substantially direct magnetic flux path between the armature and the fuel inlet connector.

Preferably the fuel inlet connector has a lowermost surface spaced adjacent and above the armature to define a working gap through which the armature is movable, the lowermost end portion of the fuel inlet connector defining with the armature and the valve body, a direct path for magnetic flux. The fuel inlet connector has a chamfered configuration along the lower end portion on the outer side thereof so as to reduce the thickness of the fuel inlet connector whereby the reduced thickness portion is in direct face-to-face relation with the opposed upper surface portion of the armature thereby providing a ferromagnetic metal-to-metal path for magnetic flux lines generated by the coil and thereby reducing leakage of the flux lines outside of the ferromagnetic metal-to-metal path.

The lower end portion of the fuel inlet connector is positioned adjacent the armature and has a generally chamfered configuration along the lowermost outer end thereof to reduce the effective surface area of the lowermost face of the fuel inlet connector to substantially match the upper end face of said armature. The generally chamfered portion of the fuel inlet connector is preferably arcuate in cross-section, and a valve needle is adapted for selective engagement and disengagement with the fixed valve seat.

In the preferred embodiment fuel inlet connector and the armature are adapted to permit a first flow path of gaseous fuel between the armature and the magnetic coil as part of a path leading to the fuel valve. The armature defines at least one first fuel flow aperture extending through a wall portion thereof to define a second flow path of gaseous fuel as part of a path leading to the fuel valve. The armature defines at least one-second aperture in a wall portion to define a third flow path of gaseous fuel as part of a path leading to said fuel valve, the second aperture being oriented at a generally acute angle with respect to the longitudinal axis.

The electromagnetically operable fuel injector further comprises a valve body positioned downstream of the armature and having at least one aperture in a wall portion thereof for reception of fuel from at least two of the flow paths of gaseous fuel from the armature and the fuel inlet connector. The fuel inlet connector is positioned above the armature and is spaced from the armature by the working gap, the fuel inlet connector defining a central opening for directing fuel toward the armature and the fixed valve seat. The fuel inlet connector further includes a fuel filter at an upper end portion thereof for filtering fuel.

BRIEF DESCRIPTION OF THE DRAWINGS

Preferred embodiments of the invention are described hereinbelow with reference to the drawings wherein.

DESCRIPTION OF THE PREFERRED EMBODIMENTS

Figure 1:
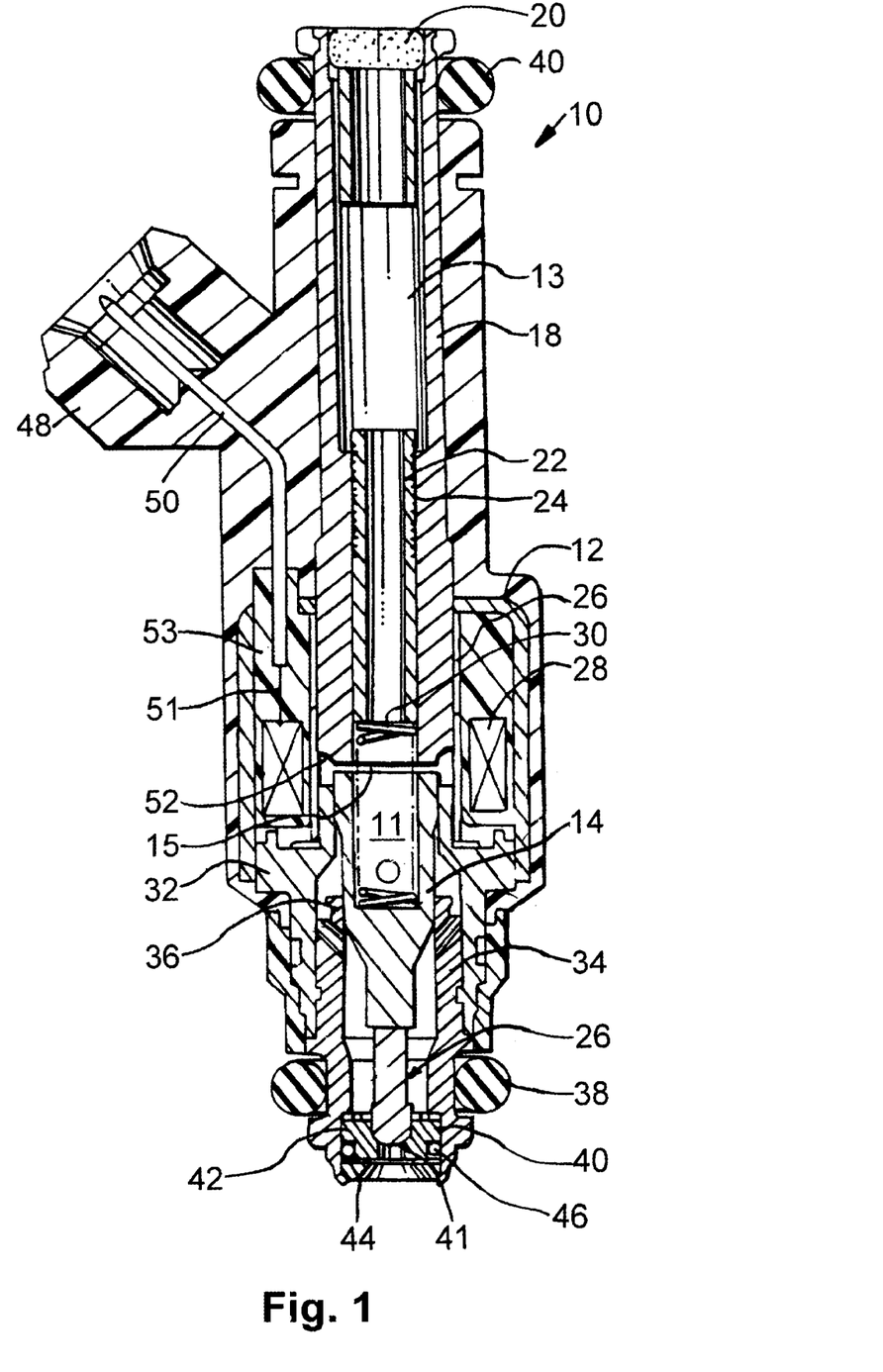
FIG. 1 is a view partially in cross-section, of a preferred embodiment of a fuel injector constructed according to the invention.

Referring initially to FIG. 1, there is shown a fuel injector 10 which is constructed according to the present invention. Injectors of the type contemplated herein are described in commonly assigned U.S. Pat. No. 5,494,224, the disclosure of which is incorporated herein by reference. Significant features of the present invention are also disclosed in commonly assigned, commonly filed copending application Ser. No. 09/320,178 entitled Contaminant Tolerant Compressed Natural Gas Injector and Method of Directing Gaseous Fuel Therethrough, the disclosure of which is incorporated herein by reference. Although the fuel injector of the present invention particularly contemplates the use of compressed natural gas (hereinafter "CNG"), liquid fuels such as gasoline are also contemplated.

The injector 10 includes housing 12 containing armature 14 to which valve needle 16 is attached by crimping. Fuel inlet connector 18 includes central fuel flow opening 13 and CNG filter 20 at the upper end portion of opening 13 as shown. The fuel inlet connector 18 also includes adjusting tube 22 connected thereto at 24 by a known crimping procedure. Housing 12 includes inner non-magnetic shell 26 which surrounds the inlet connector 18 and armature 14 having central fuel flow opening 11 as shown. Armature 14 and inlet connector 18 define with housing 12, an enclosure for coil 28 which is selectively energized to move armature 14 and needle 16 upwardly to open the valve aperture 41, and selectively deenergized to permit armature 14 and needle 16 to return to the "closed valve" position as shown, under the force of coil spring 30. Fuel flow into the injector begins at filter 20 and passes through fuel inlet connector 18, to armature 14, and ultimately to valve aperture 41 of valve seat 40 into the intake manifold of the engine (not shown). Needle 16 has cylindrical end portion 17.

Figure 2:
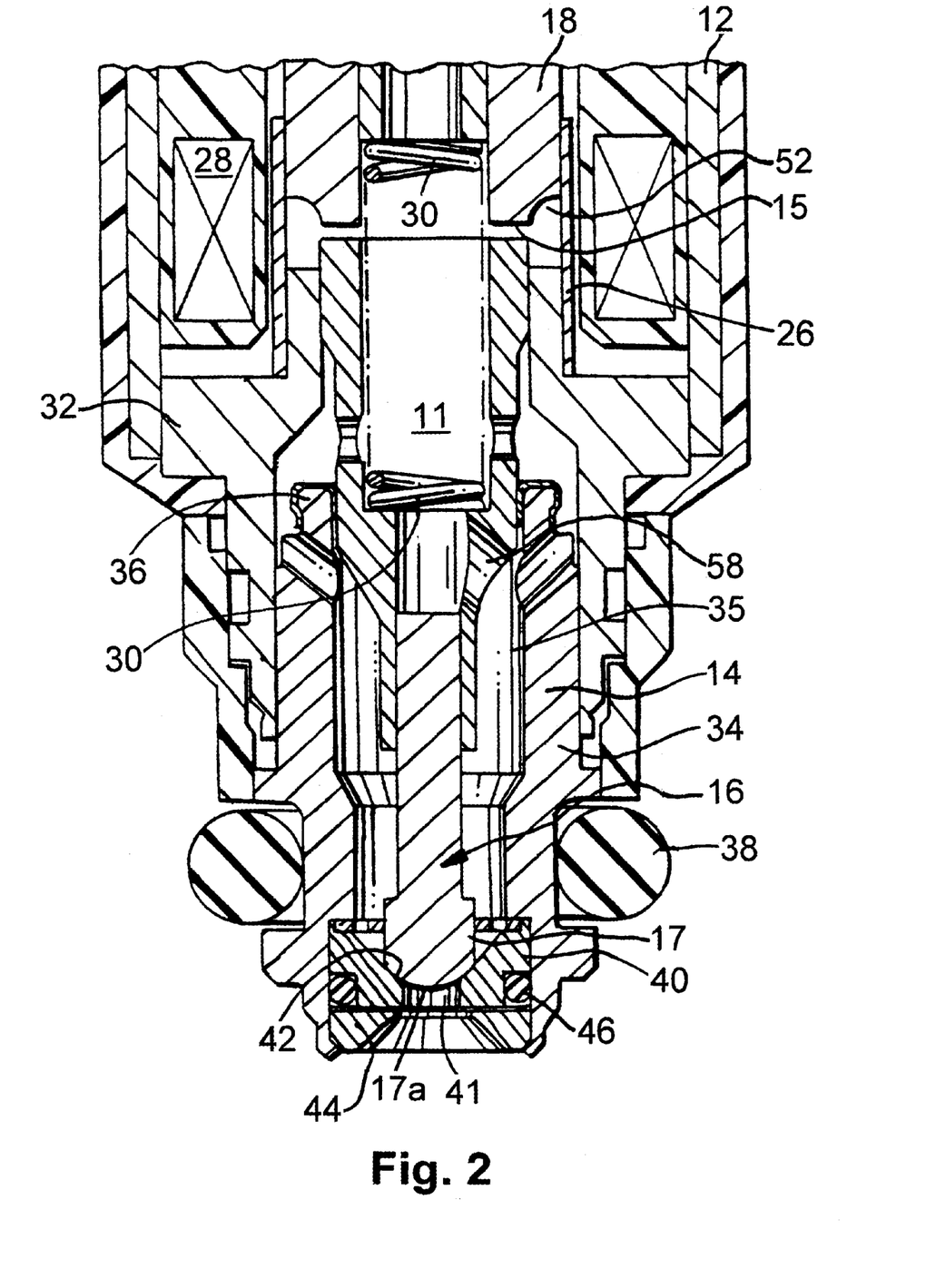
FIG. 2 is an enlarged cross-sectional view of the lower portion of the injector of FIG. 1, showing the improved fuel inlet connector configuration which forms part of the invention.

Referring further to FIG. 1 in conjunction with FIG. 2, valve body shell 32, which is ferromagnetic material and which forms part of a magnetic circuit, surrounds valve body 34 and has at the upper end, upper guide 36 as shown. Lower O-rings 38 provide sealing between the injector 10 and the engine intake manifold (not shown) and upper O-rings 40 provide sealing between the injector 10 and the fuel rail (also not shown). Valve body 34 defines central fuel flow opening 35.

Referring again to FIGS. 1 and 2, valve seat 40 contains a valve orifice 41 and a funnel shaped needle rest 42 having a frusto-conical surface for reception of a spherical end sealing surface 17a of needle 16. The valve seat 40 is maintained in position by back-up washer 44 and sealed against fuel leakage with valve body 34 by O-ring 46. Overmold 48 of suitable plastic material such as nylon supports terminal 50 which extends into coil 28 and is connected via connection 51 to provide selective energization of the coil to open the valve by raising the armature 14 and valve needle 16 against the force of spring 30. Coil 28 is surrounded by dielectric plastic material 60 as shown in the Figs.

In FIG. 1, the magnetic field producing coil 28 which is energized via terminal 50 through connector 51 is positioned within housing 12 adjacent a non-magnetic shell 26. The top end of armature 14 is spaced below inlet connector 18 to define a working gap 15 which permits the armature 14 and needle 16 to move upwardly to open the valve at seat 40 when coil 28 is energized. Inlet connector 18 is made of a ferromagnetic material such as magnetic stainless steel, iron or ferrous steel. The reason for such upward movement of armature 14 is that coil 28 is formed of a plurality of wound coils which, when energized, produce a magnetic field—or flux—which causes the armature 14 to move upwardly into the field due to the fact that the armature is made of a ferromagnetic material such as magnetic stainless steel, iron or ferrous steel. When the coil is deenergized, the armature moves downwardly under the force of coil spring 30, thereby returning the needle 16 to seat 40, thus sealing the aperture 41.

In comparison to gasoline systems the injector 10 has a large working gap 15 as shown, due to the high fuel flow required for proper engine calibration. The working gap 15 for gasoline is about 0.08 mm to about 0.14 mm and about 0.3 mm for compressed natural gas. In the injector 10, the highest reluctance portion of the circuit are the lower section consisting of the working gap 15, the radial air gap between the armature and valve body shell, and the connection between housing 12 and valve body shell 32. Simulations show significant leakage occurring above working gap 15 and through the coil 28, with some flux completely bypassing the working gap 15.

Figure 3:
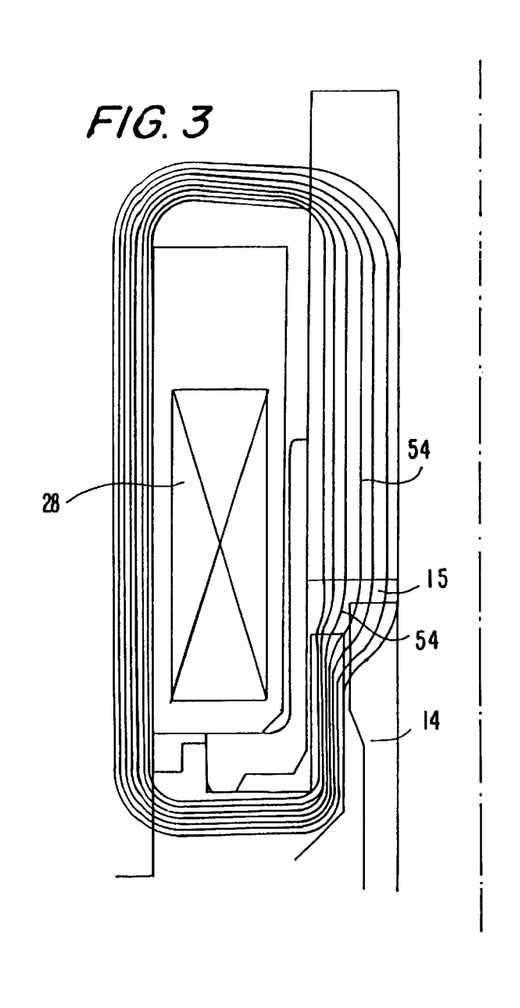
FIG. 3 is a partial cross-sectional view of a fuel inlet connector in the magnetic coil region, constructed according to the prior art and illustrating by flux lines the strength and direction of the magnetic field produced by the coil.
Figure 4:
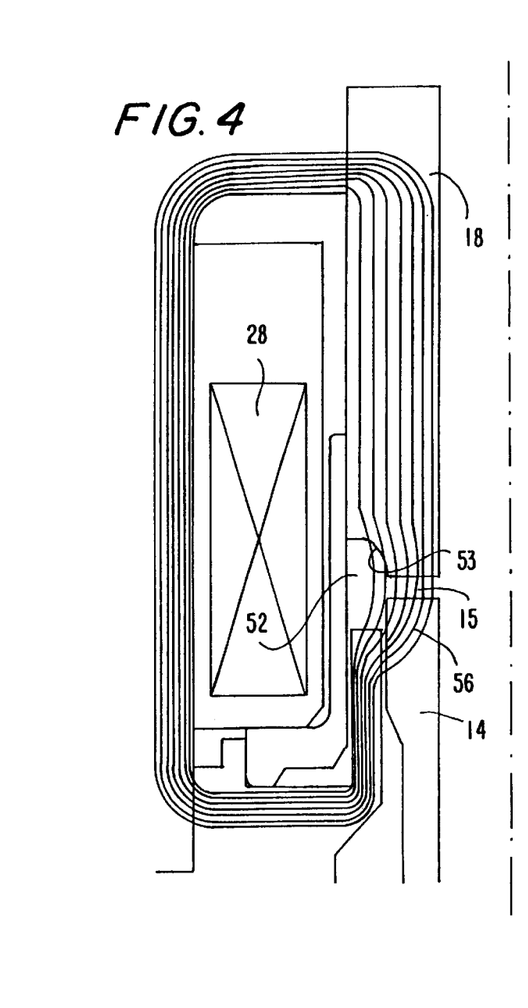
FIG. 4 is a partial cross-sectional view of a fuel injector, including the coil region and fuel inlet connector as shown in FIG. 3, modified in accordance with the present invention to direct the magnetic field in a manner to reduce leakage and improve intensity of the magnetic field.

Referring now to FIG. 3, there is illustrated a portion of an injector constructed according to the prior art, shown partially in cross-section, in the portion adjacent the vicinity of the working gap 15. FIG. 4 illustrates the corresponding portion of an improved injector constructed according to the present invention as modified.

In FIG. 4, the lower end portion of inlet connector 18 is modified according to the invention to include an inner notch 52, or flux director. In particular, the notch 52 appears in the cross-sectional view of the inlet connector 18 as a generally arcuate chamfer 53 on the lower outer portion of the inlet connector 18. In the presently known injector shown in FIG. 3, the flux produced by energizing coil 28 is shown schematically as a series of partially concentric flux lines 54 which are not uniformly spaced and which actually stray into the air gaps surrounding the working gap 15. In the improved injector of FIG. 4, the flux lines are shown as similarly wavy generally concentric lines 56, which are generally uniformly spaced and which are clearly directed between the armature 14 and to the inlet connector 18, while minimizing the existence of flux lines in the air spaces surrounding the armature/inlet connector interface referred to as working gap 15.

As can be seen by comparing FIG. 4 to FIG. 3, the portion of the flux lines 56 in FIG. 4 are effectively lengthened and are of increased intensity, concentration, and concentric uniformity in the working gap 15 between the inlet connector 18 and the housing 12. This increased path length reduces the amount of leakage which the injector experiences during operation, and this reduction in the amount of leakage allows for increased effective use of the magnetic field which is produced to open the valve needle 16 of the injector 10. Thus the flux lines in FIG. 4 are substantially more concentrated and of increased strength in the working gap 15 thereby facilitating significantly improved control over the movement of the armature and needle 16 through the magnetic field.

Figure 5:
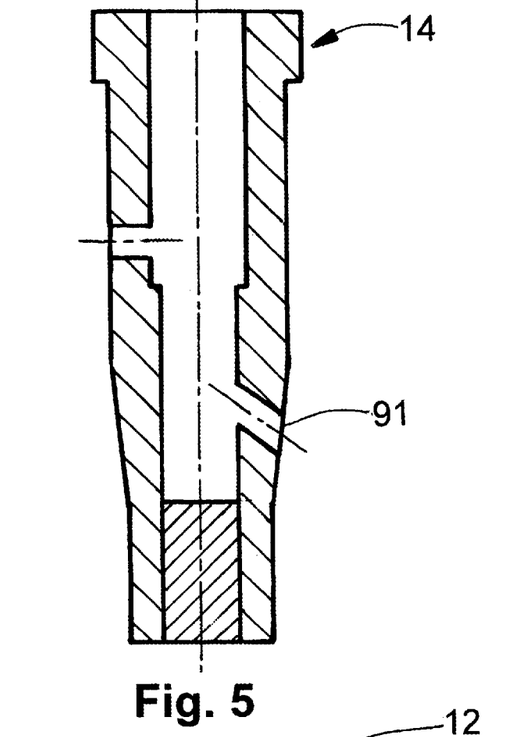
FIG. 5 is an elevational cross-sectional view of the armature.

FIG. 5 shows the armature 14 including a second aperture 91. The second aperture 91 can be disposed in a wall portion of the armature 14 to define a third flow path of gaseous fuel as part of a path leading to the fuel valve. The second aperture 91 can be oriented at a generally acute angle with respect to the longitudinal axis of the fuel injector.

Figure 6:
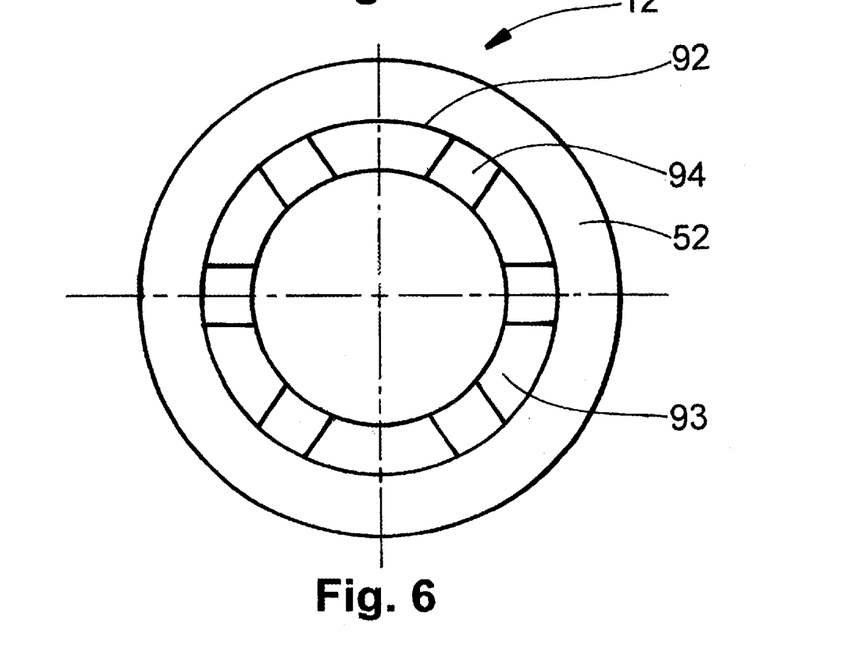
FIG. 6 is a plan view of the bottom surface of the fuel inlet connector.

FIG. 6 shows a lower surface 92 of the fuel inlet connector 12. The lower surface 92 has a plurality of radially extending raised pads 93 and recessed portions 94 disposed between the pads 93. The recessed portions 94 permit fuel flow across the working gap defined by the fuel inlet connector and the armature.

As noted, the present invention is particularly useful for fuel injectors utilizing CNG, for which it is intended, since efficient burning of the gaseous fuel needs increased optimization as compared with conventional fuels. However, the present invention is also contemplated for use with injectors in engines using conventional liquid fuels, since optimization of the armature control and fuel metering is advantageous with all systems. In addition, the injector disclosed in commonly assigned application Ser. No. 09/320,176 entitled Compressed Natural Gas Injector Having Improved Low Noise Valve Needle, the disclosure of which is incorporated herein by reference, is compatible with the improvements disclosed herein. Accordingly, such an injector incorporating all of such features combined would represent a significant improvement in injector technology.

Preferably the invention disclosed herein contemplates a fuel injector as disclosed in the aforementioned commonly assigned, copending application Ser. No. 09/320,178 entitled Contaminant Tolerant Compressed Natural Gas Injector and Method of Directing Gaseous Fuel Therethrough wherein the flow of natural gas is divided into at least three distinct paths leading to the fuel valve.

Although the invention has been described in detail with reference to the illustrated preferred embodiments, variations and modifications may be provided within the scope and spirit of the invention as described and as defined by the following claims.

What is claimed is:

1. An electrically operable fuel injector for a compressed natural gas fuel injection system of an internal combustion engine, said injector having a generally longitudinal axis, the electromagnectically operable fuel injector comprising:

a) a magnetic coil;

b) an armature magnetically coupled to said magnetic coil and being movably responsive to said magnetic coil, said armature being made of a ferromagnetic metal material and having a first end portion and an opposite second end portion;

c) a valve closing element connected to said second end portion of said armature and interactive with fixed valve seat of a fuel valve to selectively permit fuel to pass through said valve seat as said valve closing element is moved to a valve open position by said armature;

d) a valve body at least partially surrounding said armature; and e) a fuel inlet connector extending in a generally longitudinal direction and being made of a ferromagnetic metal material, said armature defining a path for fuel to enter said inlet connector and to be directed toward said armature, said fuel inlet connector having an end surface facing said first end portion of said armature across a working gap through which said armature is movable, said end surface of said fuel inlet connector and said armature and said valve body defining a direct path for magnetic flux, said end surface having a chamfered configuration along an outer portion of said fuel inlet connector so as to reduce the thickness of said end surface, said reduced thickness portion is in direct face-to-face relation with said first end portion of said armature and positoned adjacent said armature, thereby providing a ferromagnetic metal-to-metal path for magnetic flux lines generated by said coil and thereby reducing leakage of the flux lines outside of the ferromagnetic metal-to-metal path, wherein said chamfered configuration of said fuel inlet connector is an arcuate notch formed between the end surface and the outer portion of the inlet connector.

2. An electrically operable fuel injector for a compressed natural gas fuel injection system of an internal combustion engine, said injector having a generally longitudinal axis, the electromagnetically operable fuel injector comprising:

a) a magnetic coil;

b) an armature magnetically coupled to said magnetic coil and being movably responsive to said magnetic coil, said armature being made of a ferromagnetic metal material and having a first end portion and an opposite second end portion;

c) a valve closing element connected to said second end portion of said armature and interactive with a fixed valve seat of a fuel valve to selectively permit fuel to pass through said valve seat as said valve closing element is moved to a valve open position by said armature;

d) a valve body at least partially surrounding said armature; and e) a fuel inlet connector extending in a generally longitudinal direction and being made of a ferromagnetic metal material, said armature defining a path for fuel to enter said inlet connector and to be directed toward said armature, said fuel inlet connector having an end surface facing said first end portion of said armature across a working gap through which said armature is movable, said end surface of said fuel inlet connector and said armature and said valve body defining a direct path for magnetic flux, said end surface having a chamfered configuration along an outer portion of said fuel inlet connector so as to reduce the thickness of said end surface, said reduced thickness portion is in direct face-to-face relation with said first end portion of said armature thereby providing a ferromagnetic metal-to-metal path for magnetic flux lines generated by said coil and thereby reducing leakage of the flux lines outside of the ferromagnetic metal-to-metal path.

3. The electromagnetically operable fuel injector according to claim 2, wherein said end surface of said fuel inlet connector is positioned adjacent said armature and has a generally chamfered configuration along the outer portion thereof to reduce the effective surface area of the end surface of said fuel inlet connector to substantially match the first end portion of said armature.

4. The electromagnetically operable fuel injector according to claim 3, wherein said generally chamfered portion of said fuel inlet connector is arcuate in cross-section.

5. The electromagnetically operable fuel injector according to claim 4, wherein said valve-closing element is a valve needle adapted for selective engagement and disengagement with said fixed valve seat.

6. The electromagnetically operable fuel injector according to claim 5, wherein said valve needle is attached to said armature by crimped portions.

7. The electromagnetically operable fuel injector according to claim 6, wherein said fuel inlet connector and said armature are adapted to permit a first flow path of gaseous fuel between said armature and said magnetic coil as part of a path leading to said fuel valve.

8. The electromagnetically operable fuel injector according to claim 7, wherein said armature defines at least one first fuel flow aperture extending through a wall portion thereof to define a second flow path of gaseous fuel as part of a path leading to said fuel valve.

9. The electromagnetically operable fuel injector according to claim 8, wherein said armature defines at least one second aperture in a wall portion to define a third flow path of gaseous fuel as part of a path leading to said fuel valve.

10. The electromagnetically operable fuel injector according to claim 9, wherein said at least one second aperture is oriented at a generally acute angle with respect to the longitudinal axis.

11. The electromagnetically operable fuel injector according to claim 10, wherein said valve body is positioned downstream of said armature and has at least one aperture in a wall portion thereof for reception of fuel from at least two of said flow paths of gaseous fuel from said armature and said fuel inlet connector.

12. An electromagnetically operable fuel injector for an internal combustion engine, said injector defining a generally longitudinal axis, said electromagnectically operable fuel injector comprises:
   a) an outer housing;
   b) a fuel inlet connector positioned in of said outer housing for reception of fuel therein;
   c) an armature made of ferromagnetic metal material and positioned adjacent said fuel inlet connector and defining a generally elongated central opening to receive fuel flow from said fuel inlet connector, said armature having a valve closing element positioned at a first end portion and which interacts with a fixed valve having a valve seat associated with a housing to selectively permit fuel flow through a valve aperture associated with said valve seat;
   d) a magnetic coil system having a magnetic coil for selectively moving said armature and said valve closing element away from said valve seat and toward said fuel inlet connector when said magnetic coil system is energized so as to permit fuel flow through said valve aperture; and
   e) a resilient device to cause said armature and said valve closing element to move toward said valve seat when said magnetic coil system is deenergized;
   f) wherein said fuel inlet connector is made of a ferromagnetic metal material and extends along the generally longitudinal axis adjacent to said armature, said fuel inlet connector defines a path for fuel to enter said inlet connector and to be directed toward said armature, said fuel inlet connector adapted to permit a first flow path of gaseous fuel between said armature and said magnetic coil, said fuel inlet connector having an end surface facing said armature across a working gap through which said armature is movable, said end surface of said fuel inlet connector and said armature defining a direct path for magnetic flux, said end surface having a chamfered configuration along an outer portion of said fuel inlet connector so as to reduce the thickness of said end surface, said reduced thickness portion is in direct face-to-face relation with said armature thereby providing a ferromagnetic metal-to-metal path for magnetic flux lines generated by said magnetic coil system and thereby reducing leakage of the flux lines outside of the metal-to-metal path, said armature defining at least one first fuel flow aperture extending through a wall portion thereof to define a second flow path of gaseous fuel defing at least one second aperture in a wall portion to define a third flow path of gaseous fuel leading to said fuel valve.

13. The electromagnetically operable fuel injector according to claim 12, wherein said fuel inlet connector comprises an upper end portion adapted for reception of gaseous fuel from a fuel source, and a lower end portion for discharging gaseous fuel, said lower end portion of said fuel inlet connector having a lower surface which faces an upper surface of said armature, said lower surface of said fuel inlet connector having a plurality of radially extending raised pads defined thereon, said pads having recessed portions therebetween to permit fuel to flow therethrough and across, said working gap defined between said fuel inlet connector and said armature.

14. The electromagnetically operable fuel injector according to claim 13, wherein said fuel inlet connector further includes a fuel filter at an upper end portion thereof for filtering fuel.

15. An electromagnetically operable fuel injector for an internal combustion engine, said injector defining a generally longitudinal axis, said electromagnetically operable fuel injector comprises:
   a) an outer housing;
   b) a fuel inlet connector positioned in of said outer housing for reception of fuel therein;
   c) an armature made of ferromagnetic metal material and positioned adjacent said fuel inlet connector and defining a generally elongated central opening to receive fuel flow from said fuel inlet connector, said armature having a valve closing element positioned at a first end portion and which interacts with a fixed valve having a valve seat associated with said housing to selectively permit fuel flow through a valve aperture associated with said valve seat;

d) a magnetic coil system having a magnetic coil for selectively magnetically moving said armature and said valve closing element away from said valve seat and toward said fuel inlet connector when said magnetic coil system is energized so as to permit fuel flow through said valve aperture; and e) a resilient device to cause said armature and said valve closing element to move toward said valve seat when said magnetic coil system is deenergized;

f) wherein said fuel inlet connector is made of a ferromagnetic metal material and extends along the generally longitudinal axis adjacent to said armature, said fuel inlet connector defines a path for fuel to enter said inlet connector and to be directed toward said armature, said fuel inlet connector having an end surface facing said armature across a working gap through which said armature is movable, said end surface of said fuel inlet connector and said armature defining a direct path for magnetic flux, said end surface having a chamfered configuration along an outer portion of said fuel inlet connector so as to reduce the thickness of said end surface, said reduced thickness portion is in direct face-to-face relation with said armature thereby providing a ferromagnetic metal-to-metal path for magnetic flux lines generated by said magnetic coil system and thereby reducing leakage of the flux lines outside of the metal-to-metal path.

16. The electromagnetically operable fuel injector according to claim 15, wherein said fuel inlet connector and said armature are adapted to permit a first flow path of gaseous fuel between said armature and said magnetic coil as part of a path leading to said fuel valve.

17. The electromagnetically operable fuel injector according to claim 16, wherein said armature defines at least one first fuel flow aperture extending through a wall portion thereof to define a second flow path of gaseous fuel as part of a path leading to said fuel valve.

18. An electromagnetically operable fuel injection system of an internal combustion engine, said injector having a generally longitudinal axis, which comprises:

a) a magnetic coil;

b) an armature magnetically coupled to said magnetic coil and being movably responsive to said magnetic coil, said armature actauting a valve closing element which interacts with a fixed valve seat of a fuel valve and being movable away from said fixed valve seat when said magnetic coil is excited, said armature having a generally elongated shape and a generally central opening for reception of fuel; and c) a fuel inlet connector extending generally longitudinally and having a ferromagnetic portion at least partially surrounded by said magnetic coil, said fuel inlet connector being positioned adjacent said armature and defining a central path for fuel to enter said inlet connector and to be directed toward said armature for further passage toward said fixed valve seat, said fuel inlet connector having an end portion facing said armature across a working gap through which said armature is movable to open and close said valve, said end portion including a chamfer reducing said fuel inlet connector to a first transverse cross-sectional dimension corresponding to a second transverse cross-sectional dimension of an upper end face of said armature and defining a substantially direct magnetic flux path between said armature and said fuel inlet connector, wherein said chamfer is an arcuate notch formed between the end portion and the ferromagnetic portion of the inlet connector.

19. The electromagnetically operable fuel injector according to claim 18, wherein said at least one second aperture is oriented at a generally acute angle with respect to the longitudinal axis.

20. The electromagnetically operable fuel injector according to claim 19, further comprising a valve body positioned downstream of said armature and having at least one aperture in a wall portion thereof for reception of fuel from at least two of said flow paths of gaseous fuel from said armature and said fuel inlet connector.

21. The electromagnetically operable fuel injector according to claim 20, wherein said fuel inlet connector is positioned above said armature and is spaced from said armature by said working gap, said fuel inlet connector defining a through passage for directing fuel toward said armature and said valve seat.

22. The electromagnetically operable fuel injector according to claim 21, wherein said fuel inlet connector comprises an upper end portion adapted for reception of gaseous fuel from a fuel source, and a lower end portion for discharging gaseous fuel, said lower end portion of said fuel inlet connector having a lower surface which faces an upper surface of said armature, said lower surface of said fuel inlet connector having a plurality of radially extending raised pads defined thereon, said pads having recessed portions therebetween to permit fuel to flow therethrough and across, said working gap defined between said fuel inlet connector and said armature.

23. The electromagnetically actuable fuel injector according to claim 22, wherein a valve needle is connected to the lower end portion of said armature by crimped portions.

* * * * *